United States Patent [19]

May

[11] 3,966,885
[45] June 29, 1976

[54] METHODS AND MATERIALS FOR JOINING SILICON POWDER STRUCTURES

[75] Inventor: Edwin Richard Wells May, Bournemouth, England

[73] Assignee: National Research Development Corporation, London, England

[22] Filed: Mar. 3, 1975

[21] Appl. No.: 554,697

Related U.S. Application Data

[63] Continuation-in-part of Ser. No. 430,772, Jan. 4, 1974, abandoned, which is a continuation of Ser. No. 852,508, Aug. 22, 1969, abandoned.

[30] Foreign Application Priority Data

Aug. 29, 1968 United Kingdom............... 41202/68

[52] U.S. Cl.................................. 423/344; 106/55; 106/73.5; 156/89; 264/65; 264/66; 416/241 B
[51] Int. Cl.² ........................................ C01B 21/06
[58] Field of Search..................... 106/55; 423/344; 156/89

[56] References Cited
UNITED STATES PATENTS 2,618,565  11/1952  Nicholson............................. 106/55
3,854,189  12/1974  Ezis et al. ........................ 423/344 X
3,881,904   5/1975  Stokes et al. .................... 423/344 X
3,887,411   6/1975  Goodyear et al. ..................... 156/89

FOREIGN PATENTS OR APPLICATIONS 1,096,457  12/1967  United Kingdom

OTHER PUBLICATIONS

Gill et al., The Refractories Journal (Mar. 1962) "Self Bonded Silicon Nitride" pp. 92–94, 96.

*Primary Examiner*—Helen M. McCarthy
*Attorney, Agent, or Firm*—Cushman, Darby & Cushman

[57] ABSTRACT

This invention is concerned with methods and materials for producing unitary silicon nitride structures by means of joining together at least two silicon based bodies with an intervening mixture of silicon powder and a heat removable liquid binder therefor between the joining faces, mantaining said faces in juxtaposition and slowly heating the assembly in a nitriding atmosphere to remove the liquid binder and to convert the material of said bodies and the intervening silicon powder into a unitary structure.

6 Claims, No Drawings

METHODS AND MATERIALS FOR JOINING SILICON POWDER STRUCTURES

CROSS REFERENCE TO RELATED APPLICATIONS

This application is a continuation-in-part of my earlier application Ser. No. 430,772 filed Jan. 4, 1974, which, in turn was a continuation of earlier application Ser. No. 852,508 filed Aug. 22, 1969, both of which applications are now abandoned.

This invention is concerned with methods and materials for producing unitary silicon nitride structures by means of joining together at least two silicon based bodies. Use in this specification of the phrase "silicon based body" is intended to include structures or component parts individually manufactured in either silicon powder, silicon powder which has been partially nitrided and silicon nitride.

Silicon nitride structures may be prepared by producing bodies of silicon particles, for example by moulding techniques, and subsequently heating the bodies in a nitriding atmosphere to convert the silicon to silicon nitride. U.S. Pat. No. 2,618,565 and the article entitled 'Self-Bonded Silicon Nitride' by R M Gill and G Spence (The Refractories Journal March 1962) disclose such processes and it is clear from these disclosures that some silicon nitride so formed acts interstitially to bond the converted silicon particles together to form the structure. The fact that the interstitial silicon nitride is of skeletal form is recognised as the main, if not the sole, reason for the inherent strength of such structures. U.S. Pat. No. 2,618,565 suggests that silicon nitride prepared in this way can be used to bond particles of other refractory materials together by mixing silicon powder with the latter and then nitriding the silicon.

Although silicon nitride structures can be comparatively readily prepared by such moulding techniques, or even by flame spray deposition on to formers, there are some structures which cannot be made directly in this straightforward manner. Thus, for example, where the final desired shape is reentrant, or completely hollow, the simple moulding technique does not permit of a replica of the final form being prepared from silicon powder in one pressing or flame spray deposition operation.

Use of the present invention does, however, enable such relatively complicated structures to be attained while still enabling the comparatively simple preparatory techniques to be used, if desired. Thus by preparing a number of component parts by moulding or spray depositing silicon powder, these parts may be assembled into the desired final form, the parts being secured together by the method of the invention.

Thus in accordance with the invention a method of producing a unitary silicon nitride structure by joining together a least two silicon based bodies comprises providing separate bodies of a material selected from the group consisting of silicon powder and silicon powder which has been at least partially nitrided, said bodies having faces at which they are to be joined together, assembling together said bodies with their joining faces in juxtaposition, with an intervening mixture of silicon powder and a heat removable liquid binder therefor between them, said binder being such that no undesirable residue results from heating the binder, maintaining said faces in juxtaposition, and slowly heating said assembled bodies in nitriding atmosphere to remove said liquid binder and to convert the material of said bodies and the intervening silicon powder into a unitary structure.

It is to be understood, of course, that the invention is not only applicable to the preparation of relatively complicated structures. It is equally applicable to cases where simple pieces of silicon powder shapes are brought together and formed into unitary structures. The invention is also applicable to the combination of silicon nitride bodies into unitary structures provided that the nitriding atmosphere is enabled to reach the silicon powder layer to produce the silicon nitride joint. Yet again, it may be used in the repair of a silicon nitride body of theoretical density or less than theoretical density or where a silicon powder body prepared for conversion to the nitride has broken or otherwise become damaged. Other examples of use of the invention will be clear to those skilled in the art.

Preferably the silicon powder mixture is prepared using a silicon powder of fineness sufficient to pass through a 400 mesh British Standard sieve and is mixed with the liquid binder to a pourable consistency. The mixture is preferably thin enough to penetrate the spaces between and/or in the bodies to be joined; it may be applied to each of the faces of the bodies to be joined.

A suitable liquid binder has been found to be a one per cent solution of ammonium alginate in distilled water. It is well known in the art that upon slow heating through the temperature range 400°C – 500°C ammonium alginate is burnt away with only an insignificant amount of ash residue remaining. Silicon based bodies are naturally porous and, particularly for silicon powder bodies, in order to prevent excessive absorption of the alginate solution they are wetted with distilled water before application of the silicon powder and ammonium alginate mixture.

A thin film of the mixture is applied to the faces of the silicon based bodies to be joined, which are then held together under light pressure with the said mixture between them and the assembly dried at a temperature of about 110°C. The light pressure applied may be sufficient merely to maintain the faces to be joined in juxtaposition to each other with the intervening silicon powder mixture during the subsequent steps of the process. The assembly is then slowly heated in an atmosphere of nitrogen to burn off the ammonium alginate and produce a unitary silicon nitride structure, care being taken not to disturb the joint before the nitriding is complete.

Nitriding is complete in a comparatively short time at 1450°C, whereas many hours are required at lower temperatures. As the highest of these temperatures is above the melting point of silicon (1420°C) a preliminary reaction-sintering operation at temperatures between 1250°C and 1350°C is necessary so that the collapse of the powder into a molten pool may be avoided. This operation produces a rigid network which retains the uncombined silicon and thus permits a gas-solid-liquid reaction at temperatures above the melting point of silicon, the nitrogen being transported to the central areas through the now intercommunicating silicon nitride matte. The fairly rapid reaction which takes place at 1450°C results in the conversion of all the remaining silicon to a consolidated form of silicon nitride having a much greater hardness and density than that of the matte produced by solid-state reaction at the lower temperature. The nitriding of silicon may be termed a reaction bonding or reaction-sintering process; prolonged reaction-sintering at temperatures below the melting point of silicon results in the production of a skeleton of consolidated silicon nitride. Various times of reaction-sintering at temperatures below and above the melting point of silicon will result in quite different internal structures in the resulting silicon nitride; a very long reaction-sintering below 1400°C will produce an extremely dense matte and ultimately a hard skeleton of silicon nitride crystals, whereas a short 2-stage reaction-sintering process at 1350°C and 1450°C will produce a softer matrix of the silicon nitride matte in which are dispersed islands of hard, consolidated silicon nitride. A typical nitriding schedule, eg joining fins to a combustion chamber would be to heat the assembly in nitrogen for about 20 hours at 1350°C followed by about 10 hours at 1450°C.

The cross breaking strength of lap joints made in accordance with the present invention has been measured in sheer and values of 6000 psi at room temperatures have been achieved.

The present invention may also be employed to join silicon based bodies forming internal structures, since the nitrogen stmosphere is able to permeate the silicon based bodies. The present invention is also applicable to any other forms of silicon based bodies which may be developed.

I claim:

1. A method of producing a unitary silicon nitride structure by joining together at least two shaped silicon based bodies, comprising the steps of:
   a. providing separate shaped bodies of material selected from the group consisting of silicon powder and silicon powder which has been at least partially nitrided, said shaped bodies having faces at which they are to be joined together,
   b. applying to at least one of the joining faces a thin film of a mixture of silicon powder and a heat removable liquid therefor, said binder being such that no undesirable residue results from heating the binder,
   c. assembling together said shaped bodies with their joining faces in juxtaposition and in contact with the intervening mixture of silicon powder and binder, the joining faces being held together under light pressure,
   d. maintaining said faces in juxtaposition, and
   e. slowly heating said assembled shaped bodies in a nitriding atmosphere to remove said liquid binder, continuing said heating to avoid collapse of the intervening silicon powder into a molten pool, and to convert the material of said bodies and the intervening silicon powder into a unitary silicon nitride structure.

2. A method as claimed in claim 7, wherein said silicon powder used in step (b) is of fineness such as to pass through a 400 mesh British Standard sieve.

3. A method as claimed in claim 1, wherein at least the face regions of said bodies are wetted with distilled water prior to step (b).

4. A method as claimed in claim 1, wherein the liquid binder is an aqueous solution of ammonium alginate.

5. A method as claimed in claim 4, wherein said solution contains one percent of ammonium alginate.

6. A method as claimed in claim 1, wherein said separate shaped bodies are of silicon powder which has been at least partially nitrided.

* * * * *